(12) United States Patent
Trombini

(10) Patent No.: US 12,345,562 B2
(45) Date of Patent: Jul. 1, 2025

(54) LOAD CELL FOR METALLIC SILOS

(71) Applicant: L.C. SRL, Isorella (IT)

(72) Inventor: Luca Trombini, Isorella (IT)

(73) Assignee: L.C. SRL, Isorella (IT)

( * ) Notice: Subject to any disclaimer, the term of this patent is extended or adjusted under 35 U.S.C. 154(b) by 290 days.

(21) Appl. No.: 17/786,386

(22) PCT Filed: Dec. 17, 2020

(86) PCT No.: PCT/IT2020/050312
§ 371 (c)(1),
(2) Date: Jun. 16, 2022

(87) PCT Pub. No.: WO2021/124368
PCT Pub. Date: Jun. 24, 2021

(65) Prior Publication Data
US 2023/0010494 A1    Jan. 12, 2023

(30) Foreign Application Priority Data

Dec. 19, 2019    (IT) .......................... 202019000004663

(51) Int. Cl.
*G01G 3/12*    (2006.01)
(52) U.S. Cl.
CPC ..................... *G01G 3/12* (2013.01)
(58) Field of Classification Search
CPC .................................. G01G 3/12; G01L 1/20
USPC ....................................................... 177/211
See application file for complete search history.

(56) References Cited

U.S. PATENT DOCUMENTS

| | | | |
|---|---|---|---|
| 3,089,518 A * | 5/1963 | Bradley | G01G 5/003 177/208 |
| 3,981,195 A * | 9/1976 | Forney | B65D 90/48 73/296 |
| 4,996,882 A | 3/1991 | Kistler | |
| 6,320,142 B1 | 11/2001 | Burton et al. | |
| 9,360,360 B2 * | 6/2016 | Eakin | G01G 23/012 |
| 9,726,559 B2 * | 8/2017 | Bodmer | G01G 21/244 |
| 9,879,413 B2 * | 1/2018 | Castelli | A63H 33/105 |

(Continued)

FOREIGN PATENT DOCUMENTS

| | | |
|---|---|---|
| CN | 1204767 A | 1/1999 |
| CN | 1703612 A | 11/2005 |

(Continued)

OTHER PUBLICATIONS

Office Action and Search Report, issued in Chinese Patent Application No. 202080087589.7 dated Sep. 6, 2023.

*Primary Examiner* — Jacques M Saint Surin
(74) *Attorney, Agent, or Firm* — NIXON & VANDERHYE

(57) ABSTRACT

Disclosed is a device in the field of systems for measuring the weight of an object and in more detail concerns a load cell for metallic silos, or tanks and hoppers. The load cell for metallic silos includes: a bottom base plate for supporting it on a ground surface; a top plate for receiving and supporting a portion of a metallic silo to be weighed; a flexible element including at least one extensometer; and a spacer interposed between the bottom plate and the flexible element. Advantageously, the load cell includes a monobloc structure, substantially parallelepiped in shape, including the bottom plate, the top plate and the flexible element.

19 Claims, 1 Drawing Sheet

(56) References Cited

U.S. PATENT DOCUMENTS

| | | |
|---|---|---|
| 10,921,878 B2 * | 2/2021 | Noris ................... G06F 3/011 |
| 11,740,120 B2 * | 8/2023 | Bouchard .............. G01G 23/02 |
| | | 177/1 |
| 2005/0081641 A1 | 4/2005 | Loher et al. |
| 2015/0107913 A1 | 4/2015 | Trakhimovich |
| 2018/0252571 A1 | 9/2018 | Schreiber et al. |

FOREIGN PATENT DOCUMENTS

| | | |
|---|---|---|
| CN | 101706313 A | 5/2010 |
| CN | 104395715 A | 3/2015 |
| CN | 104568097 A | 4/2015 |
| CN | 108534873 A | 9/2018 |
| CN | 109029665 A | 12/2018 |
| DE | 103 05 716 | 5/2004 |
| DE | 102011106851 A1 | 1/2013 |

* cited by examiner

LOAD CELL FOR METALLIC SILOS

This application is the U.S. national phase of International Application No. PCT/IT2020/050312 filed Dec. 17, 2020, which designated the U.S. and claims priority to IT 202019000004663 filed Dec. 19, 2019, the entire contents of each of which are hereby incorporated by reference.

TECHNICAL FIELD

The invention relates to the field of systems for measuring the weight of an object and in more detail concerns a load cell for metallic silos, or tanks and hoppers.

BACKGROUND ART it is possible to determine the weight of an object by positioning it on, or suspending it from, a load cell.

There are different types of load cells for different applications.

Among the most commonly used load cells, due to their simplicity and relatively low cost, are bending beam load cells, adapted to be positioned under a steel storage structure that can be loaded with a loose product from above.

Bending beam load cells are usually composed of an elastic element, on which extensometers have been positioned.

The elastic element is generally made of metal, steel or aluminium, and is consequently very strong, while also having a certain elasticity. As the name suggests, the steel elastic element undergoes a slight deformation under load, but is able to return to the initial position by responding to stress. These minimum variations can be detected with the extensometers. The extensometers are firmly connected to the elastic element, and consequently move integrally therewith. The deformation of the extensometers is then interpreted by analytic electronics to determine the weight of the load over the cell.

Said elastic element, which is usually structurally configured as a cantilever beam, must be installed on a suitable mechanical support that allows it to function correctly.

According to the prior art, the bending load cells most widely used for being arranged under metallic silos, of the type comprising a hopper or tank for storing loose material and a plurality of legs for supporting it on the ground, comprise:
- a base plate for fastening to a ground surface;
- a top plate for supporting the load to be weighed, on which, for example, one leg of said silos rests;
- a cantilever flexible element, associated with which are extensometers, provided with a first end associated with said base plate and a second end on which said top plate is placed;
- a spacer interposed between said base plate and said first end of said flexible element, necessary to maintain said flexible element in a raised position leaving space for it to bend under load without directly contacting the ground surface.

Said base plate comprises holes for the passage of screws for fastening it to the ground.

Load cells of this type have some limits and drawbacks, due to the need to build a proper mechanical support, comprising a base plate, a top plate and a spacer.

Conventional load cells have the disadvantage of being: costly;
made with different components that have to be assembled on site, requiring care and precision, owing to the delicacy and sensitivity of the parts;
not easily replaceable in the case of malfunction, due to the manner in which they are fastened to the ground and to the silos.

PRESENTATION OF THE INVENTION

The object of the present invention is to overcome the problems cited above, and consequently to produce a load cell for metallic silos that is safe and efficient, structurally simple to produce, with limited manufacturing costs and which is easy and fast to install, as it has no components to be assembled on site.

The objects are achieved with a load cell for metallic silos comprising:
- a bottom base plate for supporting it on a ground surface;
- a top plate for receiving and supporting a portion of a metallic silo to be weighed;
- a flexible element comprising at least one extensometer;
- a spacer interposed between said bottom plate and said flexible element, characterized in that it comprises a monobloc structure, substantially parallelepiped in shape, comprising said bottom plate, said top plate and said flexible element.

According to a first aspect of the invention, said monobloc structure comprises a first upper central portion raised in height with respect to two lateral edge strips, where said first raised upper central portion produces said top plate for receiving and supporting a portion of a metallic silo to be weighed.

According to a preferred variant of embodiment, said monobloc structure comprises a first and a second groove delimiting said lateral edge strips with respect to said first raised upper central portion.

According to a further aspect of the invention, said monobloc structure comprises a second lower central portion recessed with respect to two lateral edge strips, where said two lateral edge strips produce said bottom base plate for supporting it on said ground surface.

According to a further preferred variant of embodiment, said monobloc structure comprises a third and a fourth groove delimiting said lateral edge strips with respect to said second recessed lower central portion.

In particular, the variation of height between said second recessed lower central portion and said ground surface produces said spacer.

Advantageously, said monobloc structure comprises ground fastening means, and said ground fastening means comprise four holes, arranged in proximity of the four corners of said monobloc structure, and four corresponding screws, adapted to co-act stably with four corresponding threaded bushings provided in holes produced in said ground surface.

Preferably, two of said four holes extend to intercept a same side of said monobloc structure.

According to a further aspect of the invention, said monobloc structure comprises fastening means to said portion of metallic silo to be weighed comprising a plate provided with a hole, where said fastening means to said portion of metallic silo to be weighed comprise a blind threaded hole provided at the centre of said first raised upper central portion and a corresponding screw, adapted to co-act with said corresponding hole provided in said plate positioned at one end of said portion of metallic silo to be weighed.

The main advantages of the invention are the following.

The monobloc structure integrates both the function of fastening and anchoring the load cell to the ground, and the function of supporting and sustaining the load to be measured, i.e., the metallic silo or a part thereof.

The shape of said monobloc structure is particularly advantageous to comprise said top plate for receiving and supporting a portion of a metallic silo to be weighed, said bottom base plate for supporting it on a ground surface, said spacer that allows the actual load cell to bend without contacting the ground surface.

Said first raised upper central portion allows homogeneous distribution of the load to be weighed, for greater measurement precision.

The two lateral strips acting as base and for supporting it on a ground surface, symmetrical with respect to the top load plate, give stability to the cell.

The optional grooves provided at the sides of said first raised upper central portion and of said second recessed lower central portion reduce the section of the monobloc structure in the bending points of the load cell, consequently improving its flexibility.

The arrangement of the fastening means to the ground and to the silos to be weighed is studied to avoid interference with the sensitive components of the cell, i.e., the extensometers, optimizing the overall dimensions.

BRIEF DESCRIPTION OF THE DRAWINGS

Further characteristics and advantages of the invention will be more apparent from the detailed description set forth below, with the aid of the drawings, which show a preferred embodiment, illustrated by way of non-limiting example, where.

DETAILED DESCRIPTION OF A PREFERRED EMBODIMENT OF THE INVENTION

Figure 1:
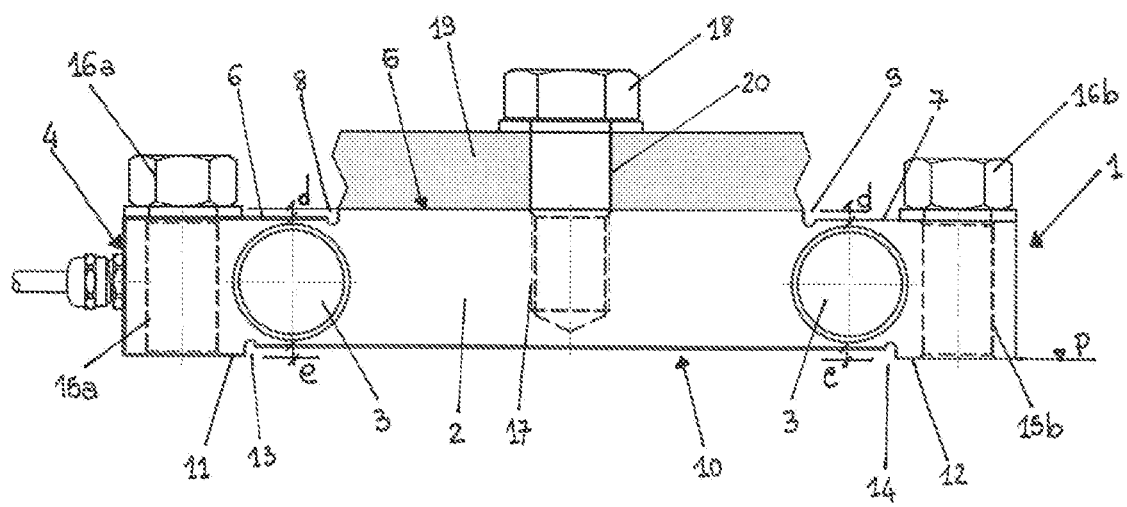
FIG. 1 shows, in a sectional view along a vertical plane, a load cell according to a preferred variant of the invention, in use below a metallic silo.

With reference to the figures, there is illustrated a load cell 1 for metallic silos. In particular, FIG. 1 illustrates the load cell 1 adapted to be positioned under a leg of a silo provided with an end plate 19 comprising a hole 20.

In the variant illustrated, said load cell 1 comprises a monobloc structure 4, substantially parallelepiped in shape, having two longer sides 41, 42 and two shorter sides 43, 44.

Said monobloc structure 4 comprises a flexible element 2, attached to which are one or more extensometers 3 that read the mechanical deformation by means of the variation of electrical resistance that this deformation causes on their electrical circuit.

Advantageously, the structural layout of said flexible element 2 comprises a double beam.

Said monobloc structure 4 comprises a first upper central portion 5 raised by a height d with respect to two lateral edge strips 6, 7 parallel to the two shorter sides 43, 44.

Said raised first upper central portion 5 produces a top plate for receiving and supporting the leg of the silos, in particular its end plate 19.

A first 8 and a second 9 groove with substantially U-shaped section are provided between said lateral edge strips 6, 7 and said first raised upper central portion 5.

The variation of height d between said first upper central portion 5 and said lateral edge strips 6, 7 produces a step useful to allow deformation of the flexible element 2, preventing the end plate 19 from touching the two lateral edge strips 6, 7.

Said monobloc structure 4 comprises a second lower central portion 10 recessed with respect to two lateral edge strips 11, 12 also parallel to the two shorter sides 43, 44.

Said two lateral edge strips 11, 12 produce a bottom base plate for supporting said load cell 1 on a ground surface P.

Said two lateral edge strips 11, 12 also act as ground support for said flexible element 2 producing said double beam layout.

A third 13 and a fourth 14 groove with substantially U-shaped section are provided between said lateral edge strips 11, 12 and said second recessed lower central portion 10.

The variation of height between said second recessed lower central portion 10 and said ground surface P produces a spacer that creates the free space inside which the flexible element 2 can effectively deform as a consequence of the load above without interfering with the ground surface P.

Said monobloc structure 4 comprises ground fastening means for said load cell 1.

Said ground fastening means comprise four holes 15a, 15b, 15c, 15d, arranged in proximity of the four corners of said parallelepiped monobloc structure 4.

Said ground fastening means also comprise four corresponding screws 16a, 16b, 16c, 16d, adapted to engage the four holes 15a, 15b, 15c, 15d of the monobloc structure 4 and four corresponding threaded bushings inserted stably in holes (not illustrated) produced in said ground surface P.

Figure 2:
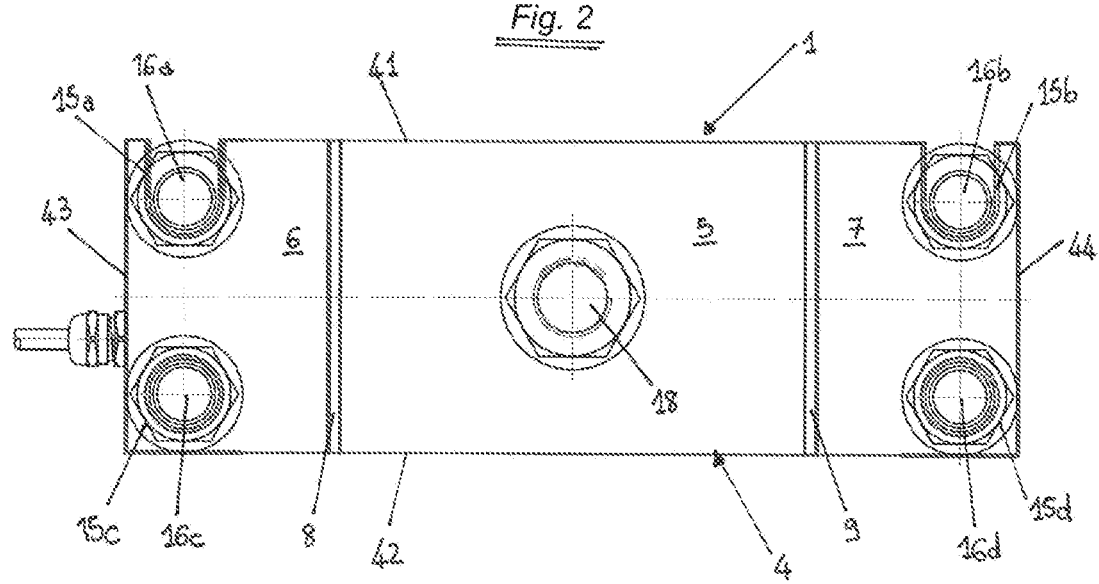
FIG. 2 shows, in a top plan view, the load cell of FIG. 1.

As is evident from FIG. 2, two 15a, 15b of said four holes extend to intercept a same longer side 41 of said monobloc structure 4, so that the load cell 1 is easily removable from below the silos by removing only two of these screws, also for replacement or maintenance.

Said monobloc structure 4 further comprises fastening means of the load cell 1 to said portion of metallic silo to be weighed, and consequently to the perforated end plate 10 of the leg of the silos.

Said fastening means comprise a blind threaded hole 17 provided at the centre of said first raised upper central portion 5 and a corresponding screw 18, this latter adapted to co-act with said blind threaded hole 17 engaging the hole 20 of said end plate 19 of the leg of the silos.

Said monobloc structure 4 is made of metallic material hardened by quenching so as to obtain greater strength.

Said monobloc structure 4 is made, for example, of stainless steel or nickel-plated steel so as to obtain a solid and safe monobloc structure.

The invention claimed is:
1. A load cell for metallic silos, comprising:
 a bottom base plate configured to support the load call on a ground surface;
 a top plate configured to receive support a portion of a metallic silo to be weighed;
 a flexible element comprising at least one extensometer;
 a spacer interposed between said bottom plate and said flexible element, wherein said load cell comprises a monobloc structure, comprising said bottom plate, said top plate and said flexible element,
 wherein said monobloc structure comprises ground fastening means comprising four holes, arranged respectively in proximity of the four corners of said monobloc structure, and four corresponding screws, adapted to co-act stably with four corresponding threaded bushings provided in holes produced in said ground surface, and wherein said monobloc structure is substantially parallelepiped in shape, having two longer sides and two shorter sides, and two of said four holes extend to intercept a same side of said monobloc structure, so that the load cell is easily removable from below the silos by removing only two of the screws.

2. The load cell according to claim 1, wherein said monobloc structure comprises a first upper central portion raised in height with respect to two lateral edge strips, where said first raised upper central portion produces said top plate for receiving and supporting a portion of a metallic silo to be weighed.

3. The load cell according to claim 2, wherein said monobloc structure comprises a first and a second groove delimiting said lateral edge strips with respect to said first raised upper central portion.

4. The load cell according to claim 1, wherein said monobloc structure comprises a second lower central portion recessed with respect to two lateral edge strips, where said two lateral edge strips produce said bottom base plate for supporting it on said ground surface.

5. The load cell according to claim 4, wherein said monobloc structure comprises a third and a fourth groove delimiting said lateral edge strips with respect to said second recessed lower central portion.

6. The load cell according to claim 4, wherein the variation of height between said second recessed lower central portion and said ground surface produces said spacer.

7. The load cell according to claim 1, wherein said monobloc structure comprises fastening means to said portion of metallic silo to be weighed comprising a plate provided with a hole, where said fastening means to said portion of metallic silo to be weighed comprise a threaded blind hole provided at the center of said first raised upper central portion and a corresponding screw, adapted to co-act with said corresponding hole provided in said plate positioned at one end of said portion of metallic silo to be weighed.

8. A load cell for metallic silos, comprising:
a flexible element comprising a raised upper central portion and a recessed lower central portion;
at least one extensometer arranged within the flexible element;
lower lateral edge strips arranged at respective opposite ends of the flexible element, the lower lateral edge strips being configured to make contact with a ground surface to which the load cell is to be secured, the recessed lower central portion being arranged between respective said lower lateral edge strips, the recessed lower central portion being recessed with respect to the lower lateral edge strips so that with the lower lateral edge strips in contact with the ground surface, the recessed lower central portion is separated from the ground surface by a space between the lower lateral edge strips; and
upper lateral edge strips arranged at respective opposite ends of the flexible element, the upper lateral edge strips being arranged on an upper side of the load cell opposite the lower lateral edge strips, the raised upper central portion being arranged between respective said upper lateral edge strips, the raised upper central portion extending to a height greater than a height of the upper lateral edge strips;
wherein with the lower lateral edge strips in contact with the ground surface, a load applied to the raised upper central portion can cause the flexible element to deflect into the space between the lower lateral edge strips, which deflection is measurable by the at least one extensometer.

9. The load cell of claim 8, further comprising two upper grooves, each defining a boundary between a respective said upper lateral edge strip and the raised upper central portion, each of the upper grooves extending below an upper surface of the upper lateral edge strips.

10. The load cell of claim 9, further comprising two lower grooves, each defining a boundary between a respective said lower lateral edge strip and the recessed lower central portion, each of the lower grooves extending above a lower surface of the recessed lower central portion.

11. The load cell of claim 10, comprising two said extensometers disposed in the flexible portion, each of the extensometers being arranged at a respective end of the flexible portion, between one of the upper grooves and one of the lower grooves.

12. The load cell of claim 10, further comprising four holes arranged respectively at four corners of the load cell, two of the holes passing through each of the upper and lower lateral edge strips, each of the holes being configured to accept a screw to secure the load cell to the ground surface by threading into a respective threaded bushing in the ground surface.

13. The load cell of claim 12, wherein two of the holes are in the form of slots open to one side of the load cell, thereby allowing the load cell to be secured into an operating position or removed from the operating position by loosening but not fully removing two of the screws arranged in the slots, and fully removing the screws arranged in holes that are not in the form of slots.

14. The load cell of claim 8, further comprising four holes arranged respectively at four corners of the load cell, two of the holes passing through each of the upper and lower lateral edge strips, each of the holes being configured to accept a screw to secure the load cell to the ground surface by threading into a respective threaded bushing in the ground surface.

15. The load cell of claim 14, wherein two of the holes are in the form of slots open to one side of the load cell, thereby allowing the load cell to be secured into an operating position or removed from the operating position by loosening but not fully removing two of the screws arranged in the slots, and fully removing the screws arranged in holes that are not in the form of slots.

16. The load cell of claim 8, wherein the overall load cell is configured as a monobloc structure having a substantially parallelepiped shape with two longer sides and two shorter sides, the upper and lower lateral edge strips being arranged along the shorter sides.

17. The load cell of claim 16, further comprising:
two upper grooves parallel to the shorter sides of the load cell, each defining a boundary between a respective said upper lateral edge strip and the raised upper central portion, each of the upper grooves extending below an upper surface of the upper lateral edge strips; and
two lower grooves parallel to the shorter sides of the load cell, each defining a boundary between a respective said lower lateral edge strip and the recessed lower central portion, each of the lower grooves extending above a lower surface of the recessed lower central portion.

18. The load cell of claim 16, further comprising four holes arranged respectively at four corners of the load cell, two of the holes passing through each of the upper and lower lateral edge strips, each of the holes being configured to accept a screw to secure the load cell to the ground surface by threading into a respective threaded bushing in the ground surface.

19. The load cell of claim 18, wherein two of the holes are in the form of slots open to one side of the load cell, thereby allowing the load cell to be secured into an operating position or removed from the operating position by loosening but not fully removing two of the screws arranged in the slots, and fully removing the screws arranged in holes that are not in the form of slots.

* * * * *